United States Patent [19]

Tomaja

[11] 4,158,616
[45] Jun. 19, 1979

[54] URANIUM OXIDE PRODUCTION

[75] Inventor: David L. Tomaja, Bartlesville, Okla.

[73] Assignee: Phillips Petroleum Company, Bartlesville, Okla.

[21] Appl. No.: 872,133

[22] Filed: Jan. 25, 1978

[51] Int. Cl.$^2$ .................... B01J 1/10; B01D 11/04
[52] U.S. Cl. .................... 204/157.1 R; 204/158 R; 423/11
[58] Field of Search .................... 204/157.1 R, 158 R; 423/260, 11

[56] References Cited

U.S. PATENT DOCUMENTS 4,080,273  3/1978  DePoorter et al. .......... 204/157.1 R

OTHER PUBLICATIONS

Rabinowitch et al., Spectroscopy and Photochemistry of Uranyl Compounds, New York, Pergamon Press, 1964, pp. 257 to 259.

Primary Examiner—Leland A. Sebastian

[57] ABSTRACT

Uranium oxide hydrate is produced by irradiating with light a solution of a suitable diluent, water-soluble uranium salt, carboxylate ion, and a rate-promoting amount of at least one suitable crown ether.

13 Claims, No Drawings

URANIUM OXIDE PRODUCTION

This invention relates to a method for producing uranium oxide hydrate.

Uranium oxides are well known and widely used in the industry as a starting material for a variety of uranium-containing compounds. Generally, uranium oxides are obtained by the roasting of higher or lower uranium oxides or uranium ores. It also has been known that uranium oxide hydrate can be obtained by the irradiation of certain uranyl acetate solutions with light of suitable wavelength. It has also been known that the rate of that photochemical reaction is increased by the addition of diethyl ether. However there is still a need for a quicker method of photochemically producing uranium oxide hydrate.

The term "uranium oxide" as used herein is intended to refer generally to any of the compounds consisting of uranium and oxygen atoms. The predominant uranium oxide hydrate formed by the present invention is generally a hydrate of triuranium octoxide ($U_3O_8$).

An object of the present invention is to provide a process for producing uranium oxide hydrate.

Another object of the present invention is to provide an improvement in the rate at which uranium oxide hydrate can be produced from solutions containing water-soluble uranium salts.

Other objects, aspects, and advangtages of the present invention will be apparent from the following disclosure.

In accordance with the instant invention uranium oxide hydrate is produced by irradiating with light a solution of a suitable diluent, water soluble uranium salt, carboxylate ion, and at least one suitable crown ether in an amount sufficient to promote the rate of uranium oxide production.

The crown ethers which are suitable for the present invention are macrocyclic polyethers selected from the group consisting of dicyclohexano-18-crown-6 and crown ethers wherein the cyclic ring consists of 4 to 10 —O—J—units wherein J for a particular crown ether is

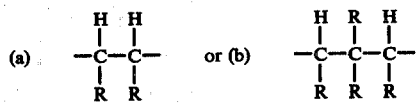

wherein each R is independently selected from the group consisting of hydrogen ad alkyl radicals having from 1 to 4 carbon atoms, or wherein at least one J is (b) and the remaining J's are (a). The R groups are all preferably hydrogen. When R groups are alkyl radicals, they preferably contain 1 or 2 carbon atoms per group. Generally the crown ethers useful in the invention contain from 12 to 30 atoms in the polyether ring. The preferred crown ethers are those containing 15 to 24 atoms in the polyether ring. Typical examples of suitable crown ethers include:

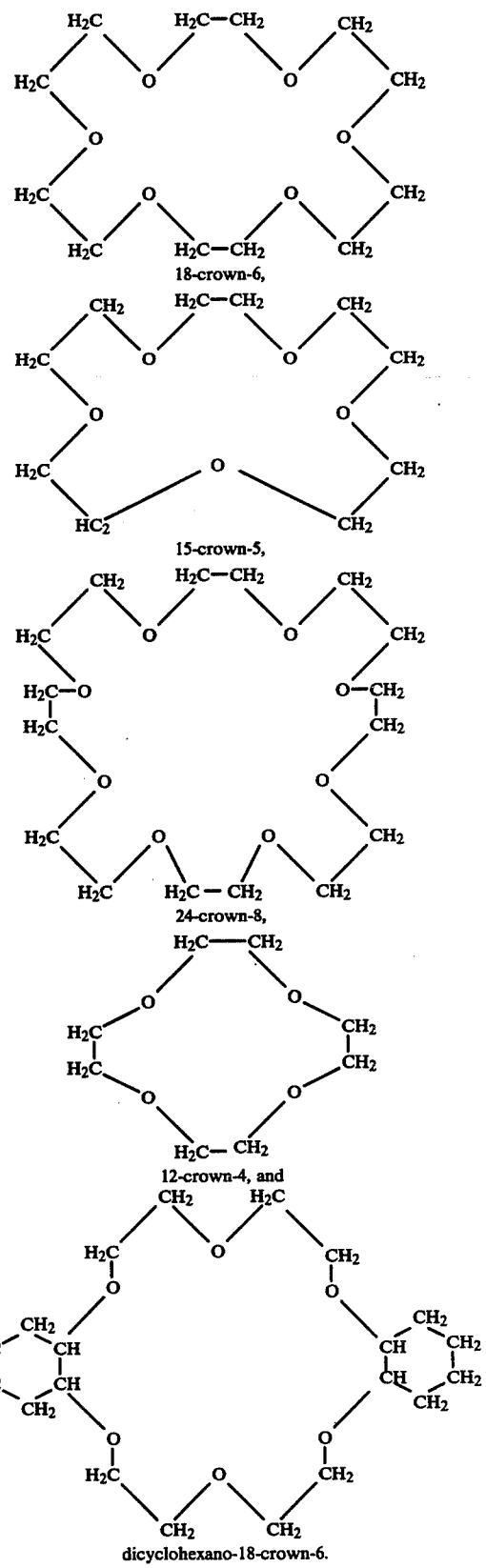

The system of nomenclature used in naming the crown ethers is explained in Pedersen, J. Am. Soc., 89, 7017 (1967).

The present invention is considered applicable to generally any water-soluble uranium salt. The invention is particularly applicable to water-soluble uranyl salts, such as uranyl halides, nitrates, carboxylates, etc.

The diluent employed as a solvent in the instant invention is selected from at least one of water, methanol, or ethanol. Water is currently preferred. Often the tailings of uranium ore processing mills, the leach liquors from uranium ore leaching processes, and uranium ore solvent extraction streams, and the like, can serve as suitable uranium compound-containing solutions. Suitable solutions can also be obtained by extracting uranium ore with acids.

The amount of uranium compound in the solution can in accordance with this invention vary over a broad range. The upper limit of uranium compound concentration is dependent primarily upon the solubility of the uranium salt in the solvent. Generally the amount of water-soluble uranium salt in the solution is such that the amount of uranium is in the range of about 0.0005 to about 10 weight percent of the weight of the solvent.

The amount of crown ether employed can also vary over a wide range; generally though the weight ratio of uranium in the water-soluble uranium salt to the crown ether is in the range of about 0.001/1 to about 1,000/1, preferably 0.01/1 to about 100/1.

The carboxylate ion in the solution is provided by employing a carboxylic acid or a salt thereof. Carboxylic acids containing from 1 to 6 carbon atoms per molecule, such as formic acid, acetic acid, propionic acid, butyric acid, valeric acid, and caproic acid, and alkali metal or ammonium salts thereof are generally useful in the invention. While the amount of carboxylate ion employed can vary over a wide range, for maximum production of uranium oxide hydrate at least one equivalent of carboxylate ion should be present for each equivalent of water-soluble uranium compound. Thus when the water-soluble uranium salt consists of uranyl carboxylates it is not necessary to include additional carboxylate ion.

Preferably, the reactant solution contains about 1 to about 10 equivalents of carboxylate ion per equivalent of water-soluble uranium compound.

Any photochemically active wavelength of light can be employed. The reaction of the present invention is believed to be caused by light having wavelengths within the visible range of the spectrum. The preferred wavelength can be determined by routine experimentation. It is also within the scope of this invention to employ light having wavelengths in the infrared and/or ultraviolet ranges as well as light in the visible ranges, for example, sunlight can be employed.

For the irradiation process, any conditions can be employed which give the desired degree of uranium oxide production. The time for the reaction is highly dependent upon the intensity of the light source and the desired conversion of the water-soluble uranium salt. Generally, the reaction time is within the range of about 10 seconds to about 24 hours, and preferably the reaction time is in the range of about 1 minute to about 10 hours.

The temperature at which the irradiation is conducted is not considered to be critical. Of course, it is preferred that the temperature be such that a substantial amount of the water-soluble uranium salt will be in solution. Generally, then the temperature will be in the range of from about 0° C. to about 10° C., and preferably about 20° C. to about 40° C.

The product of the present invention, i.e., uranium oxide hydrate, will form as a precipitate which can be recovered by any of the well-known means in the art. For example, the precipitate can be recovered from the liquid by simple filtration. The recovered precipitate can then be used either directly or further purified and dried for use in well-known processes such as roasting, calcining, etc.

Following the removal of the uranium oxide precipitate, the resulting solution can be treated to recover the remaining crown ether or carboxylate by well-known methods such as fractional distillation or solvent extraction. It is likewise within the scope of this invention to employ the recovered solution directly in dissolving more solid uranium-containing compounds for subsequent irradiation to recover more uranium oxide. It is likewise within the scope of this invention to evaporate water or alcohol from the recovered solution to obtain a concentrate of crown ether, carboxylate and solvent for subsequent addition to a uranium-containing solution followed by irradiation thereof.

The present invention will be further illustrated by the following examples:

EXAMPLE I

In the inventive run 1, to a 10 weight percent solution of uranyl acetate $[UO_2(O_2CCH_3)_2.3H_2O]$ in water (5 ml), based upon the weight of the water, was added 1 ml of a 0.118 molar solution of 18-crown-6 in water. After exposure to sunlight at room temperature, i.e., around 20° C., through a glass window for five hours, the reaction mixture was filtered to recover the purple precipitate. Drying the recovered precipitate under vacuum at 79° C. for four hours gave 0.0981 gm (a duplicate run gave 0.088 gm) of hydrated $U_3O_8$.

Prior art run 2 was conducted in the same manner as run 1 except that diethyl ether was employed instead of the crown ether. After drying the precipitate, 0.0526 gm hydrated $U_3O_8$ (0.048 gm in duplicate run) was recovered.

Thus, it was observed that under otherwise identical reaction conditions the inventive run employing 18-crown-6 gave about 1.8 times the weight of $U_3O_8$ hydrate recovered than the comparative run employing diethyl ether.

Inventive run 3 and prior art run 4 were conducted as described for runs 1 and 2, respectively, except that 1 hour irradiation time was employed. The recovery of $U_3O_8$ hydrate from inventive run 3 was 0.0253 gm and from prior art run 4 was 0.0087 gm. Thus, the inventive run gave 2.9 times the weight of desired product compared to the prior art run at shorter irradiation times than runs 1 and 2.

EXAMPLE II

The following runs were conducted to demonstrate the lower limits of uranium concentration in aqueous solution from which $U_3O_8$ hydrate can be recovered by means of the present invention.

In runs 5, 6 and 7, 5 ml of aqueous solutions of uranyl acetate, $UO_2(OAc)_2.3H_2O$, to which was added 1 ml of 0.118 molar 18-crown-6 in water, were irradiated for 30 minutes by a high-pressure mercury vapor lamp. In Table I are given the results of runs 5, 6 and 7.

TABLE I

| Run No. | Uranyl Acetate[(1)] | Precipitate |
|---|---|---|
| 5 | 10% | Yes |

TABLE I-continued

| Run No. | Uranyl Acetate[1] | Precipitate |
|---|---|---|
| 6 | 0.01% | Yes |
| 7 | 0.001% | Slight |

[1] Weight percent of uranyl acetate based on the weight of the water.

Thus, uranium at concentrations down to about 0.001% is recoverable from aqueous solutions by employing this invention.

What is claimed is:

1. A method for producing uranium oxide hydrate comprising irradiating a solution of a diluent selected from at least one of water, methanol, or ethanol; water-soluble uranium salt; carboxylate ion; and at least one crown ether selected from the group consisting of dicyclohexano-18-crown-6 and crown ether wherein the cyclic ring consists of from 4 to 10 —O—J— units wherein J for a particular crown ether is

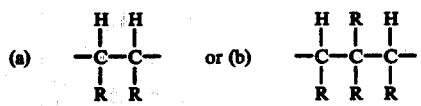

wherein each R is independently selected from the group consisting of hydrogen and alkyl radicals having from 1 to 4 carbon atoms, or wherein at least one J is (b) and the remaining J's are (a), with light of photochemically active wavelength wherein said crown ether is present in an amount sufficient to promote the rate of uranium oxide hydrate production.

2. A method according to claim 1 wherein said water-soluble uranium salt is selected from one or more uranyl salts.

3. A method according to claim 2 wherein each of said at least one crown ether contains 12 to 30 atoms in the polyether ring.

4. A method according to claim 3 wherein each of said at least one crown ether is selected from the group consisting of dicyclohexano-18-crown-6, 12-crown-4, 15-crown-5, 18-crown-6, and 24-crown-8.

5. A method according to claim 4 wherein the amount of uranyl salt in the solution is such that the uranium in the uranyl salt is in the range of about 0.0005 to about 10 weight percent of the weight of the diluent.

6. A method according to claim 5 wherein the weight ratio of uranium in the uranyl salt to the crown ether is in the range of about 0.001/1 to about 1,000/1.

7. A method according to claim 6 wherein at least about one equivalent of carboxylate ion is employed for each equivalent of uranyl salt.

8. A method according to claim 7 wherein the temperature is in the range of about 0° C. to about 100° C.

9. A method according to claim 7 wherein the temperature is in the range of about 20° C. to about 40° C.

10. A method according to claim 9 wherein said crown ether is 18-crown-6.

11. A method according to claim 10 wherein said diluent is water.

12. A method according to claim 11 wherein said carboxylate ion is acetate.

13. A method according to claim 1 wherein said carboxylate ion is selected from those containing 1 to 6 carbon atoms.